United States Patent
Fabian

(10) Patent No.: US 6,830,781 B2
(45) Date of Patent: *Dec. 14, 2004

(54) METHOD FOR PRODUCING AN SIO₂ BLANK AND APPARATUS FOR PERFORMING SAID METHOD

(75) Inventor: Heinz Fabian, Grossostheim (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 255 days.

This patent is subject to a terminal disclaimer.

(21) Appl. No.: 10/045,441

(22) Filed: Nov. 7, 2001

(65) Prior Publication Data

US 2002/0090465 A1 Jul. 11, 2002

(30) Foreign Application Priority Data

Nov. 8, 2000 (DE) ......................................... 100 55 362

(51) Int. Cl.⁷ ............................................. C23C 16/453
(52) U.S. Cl. .................. 427/452; 427/585; 427/255.37; 427/255.5; 427/163.2; 65/421; 65/425; 65/441
(58) Field of Search .......................... 65/421, 425, 441; 177/452, 585, 255.37, 255.5, 163.2

(56) References Cited

U.S. PATENT DOCUMENTS

| | | | |
|---|---|---|---|
| 4,735,633 A | 4/1988 | Chiu | 588/247 |
| 5,698,177 A | 12/1997 | Pratsinis et al. | 423/613 |
| 5,861,132 A | 1/1999 | Pratsinis et al. | 423/613 |
| 6,003,342 A | * 12/1999 | Ishida et al. | 65/484 |
| 6,380,110 B1 | 4/2002 | Werdecker et al. | 501/54 |

FOREIGN PATENT DOCUMENTS

| | | | | |
|---|---|---|---|---|
| DE | 44 16 351 A | 11/1995 | | |
| DE | 196 29 170 A | 1/1998 | | |
| JP | 56054242 A | * 5/1981 | ........... | C03B/37/00 |
| JP | 58217448 A | * 12/1983 | ........... | C03B/37/00 |
| WO | wo-9803441-a1 | * 1/1998 | | |

OTHER PUBLICATIONS

English language abstract for DE 196 29 170 A.

* cited by examiner

Primary Examiner—Timothy Meeks
(74) Attorney, Agent, or Firm—Tiajoloff & Kelly

(57) ABSTRACT

In a known method for producing an SiO₂ blank, SiO₂ particles are formed in a burner flame assigned to a deposition burner and are deposited under the effect of an electrical field on a deposition surface of a carrier rotating about its longitudinal axis, said at least one deposition burner being reciprocated in a predetermined sequence of movement along the developing blank between turn-around points. Starting from said method, in order to obtain blanks of a predetermined, in particular axially homogeneous, density and mass distribution, it is suggested according to the invention that the geometrical shape of the burner flame should be varied by the electrical field in dependence upon the position of the deposition burner during the sequence of movement. An apparatus which is suited for carrying out the method comprises a carrier which is rotatable about its longitudinal axis, a deposition burner for producing SiO₂ particles in a burner flame, a drive device by means of which the deposition burner can be reciprocated along the carrier, and a pair of electrodes which is connected to a source of voltage for producing an electrical field which is operative in the area of the burner flame and which, when viewed along the path of movement of the deposition burner, is locally inhomogeneous or variable in time in dependence upon the position of the deposition burner during the sequence of movement of the deposition burner.

16 Claims, 4 Drawing Sheets

Figure 1:
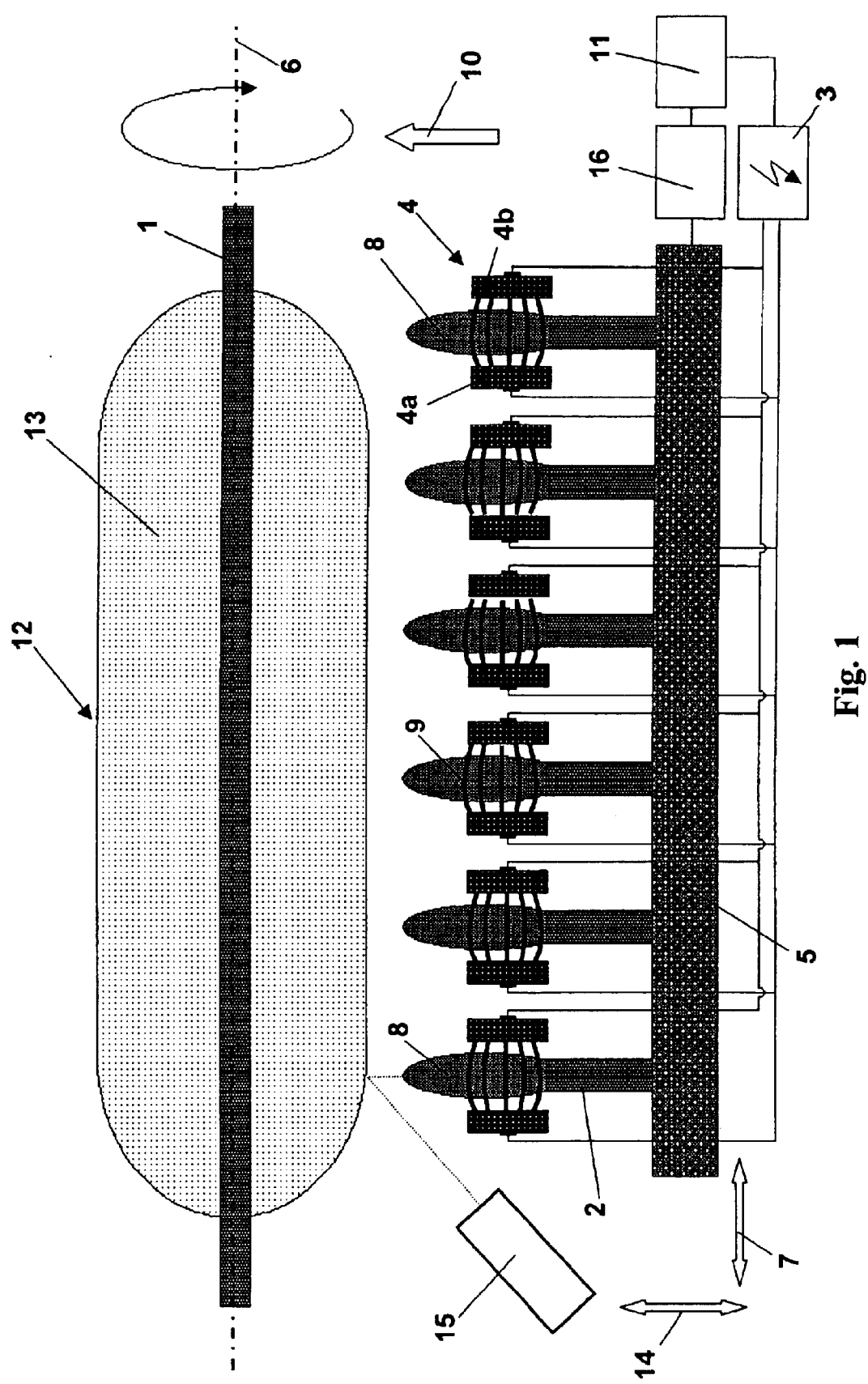

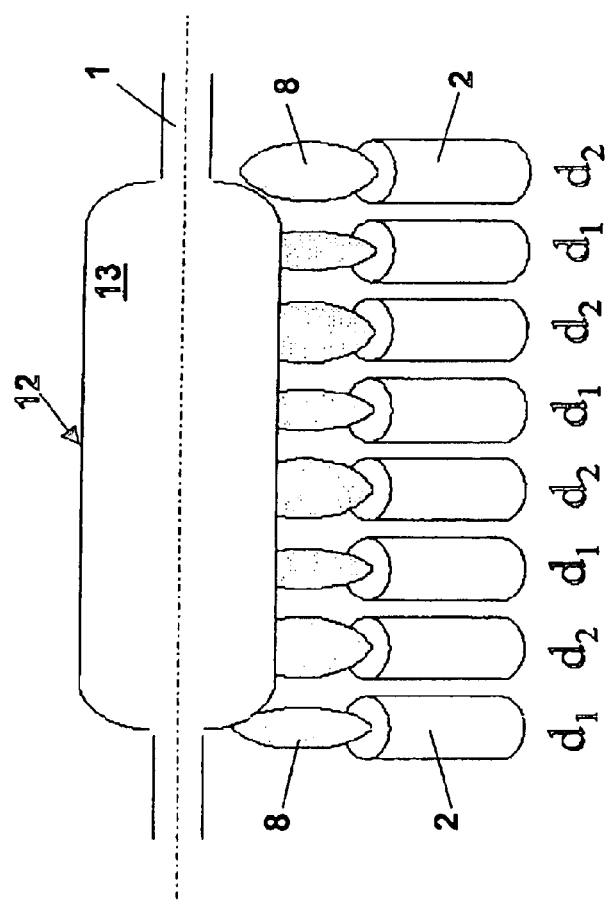
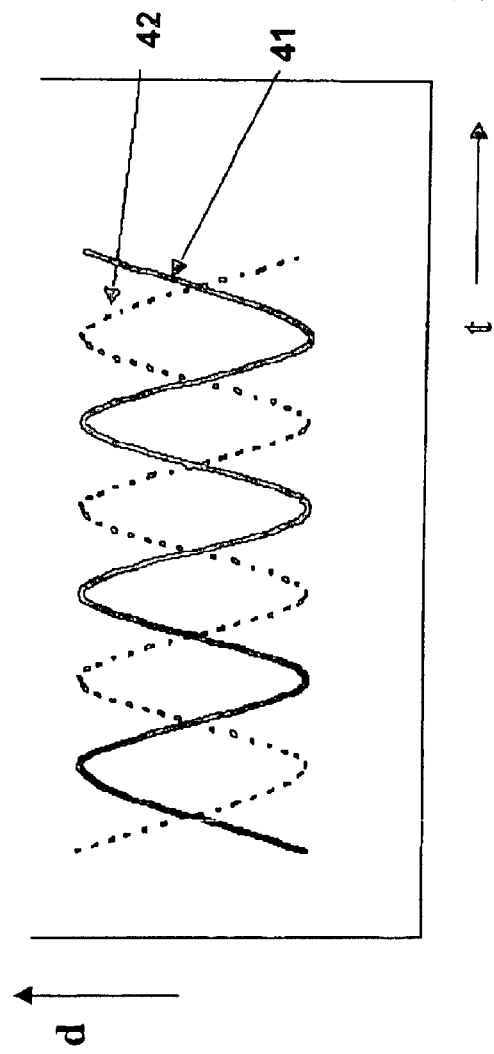
Fig. 4b
Fig. 4a

METHOD FOR PRODUCING AN SiO$_2$ BLANK AND APPARATUS FOR PERFORMING SAID METHOD

The present invention relates to a method for producing an SiO$_2$ blank by forming SiO$_2$ particles in a burner flame assigned to a deposition burner and by depositing said particles under the effect of an electrical field on a carrier rotating about its longitudinal axis, the at least one deposition burner being reciprocated during a predetermined sequence of movement along the developing blank between turn-around points.

Furthermore, the present invention relates to an apparatus for producing an SiO$_2$ blank, the apparatus comprising a carrier which is rotatable about its longitudinal axis, at least one deposition burner for producing SiO$_2$ particles in a burner flame assigned to the deposition burner, a drive device by means of which the deposition burner can be reciprocated along the carrier during a predetermined sequence of movement along the developing blank over a path of movement between turn-around points, and a pair of electrodes connected to a source of voltage for producing an electrical field which is operative in the area of the burner flame.

A method and an apparatus of the above-mentioned type are known from DE-A1 196 29 170. For producing a porous cylindrical SiO$_2$ body (hereinafter also designated as a "soot body"), SiO$_2$ particles are produced in the oxyhydrogen gas flame of a plurality of hydrolysis burners and are deposited layerwise on a horizontally oriented carrier tube rotating about its longitudinal axis. The burners are mounted at an equal distance of about 15 cm relative to one another on a burner block extending in parallel with the longitudinal axis of the carrier tube. The burner block is reciprocated along the developing porous cylindrical preform between a left and a right turn-around point by means of a controllable displacement device, with the amplitude of the translatory movement of the burner block being smaller than the length of the preform.

To increase the deposition rate of the SiO$_2$ particles, an electrical field is applied between the carrier tube and the hydrolysis burners. To this end an electrode is provided in the inner bore of the carrier tube, the second electrode (outer electrode) is formed by an elongated metallic mesh which is either connected to the burner block or arranged between the hydrolysis burners and the carrier tube. A potential difference of a few 10 kV is maintained between the two electrodes by means of an electrical DC source. The electrical field produces an electrostatic charge of the dielectric SiO$_2$ particles which are thereby accelerated towards the soot body. This results in an improvement of the deposition efficiency in comparison with a conventional method without said electrostatic charge.

In the manufacture of such soot bodies as a starting material for preforms for optical fibers, the homogeneity of the soot body poses problems as a rule. To achieve deposition conditions that are as uniform as possible and to obtain an axially homogeneous soot body, charge points which copy the spatial shape of the soot body are produced in the known method by means of the outer electrode. However, it is not possible to avoid local overheating of the soot body caused by the body being heated twice in quick succession upon reversal of the direction of movement in the area of the turn-around points of the burner movement. This thermal effect is particularly noticed during use of a burner block, for local overheating and thus axial density variations in the blank may take place over the entire blank surface due to the many turn-around points of the burner. Density variations result in areas of different reactivity in the blank; these are particularly noticed in the subsequent chemical reactions during processing into a preform and may e.g. leave inhomogeneities after sintering.

To avoid such local density variations, it is suggested in EP-A1 476 218 that both the right and the left turn-around points should be displaced by a few millimeters after each burner passage. Although the local density variations created at the turn-around points are distributed more uniformly in the preform, they are not avoided altogether. Moreover, the local distribution of the turn-around points requires great efforts with respect to apparatus and technical control.

Therefore, DE-A1 196 28 958 suggests another method in which an overheating of the preform in the areas around the turn-around points is prevented or reduced by increasing the circumferential speed of the developing preform in said areas, by lowering the flame temperature of the deposition burners or by increasing the distance of the deposition burners from the preform surface. An increase in temperature of the preform surface in the area of the turn-around points can be compensated entirely or in part by each of said measures or by a combination of the measures, so that the preform is subjected over its whole length to a heating power that is as high as possible in time and space. Axial density gradients in the preform can thereby be avoided to a substantial degree. These measures, however, require a time change in gas flows, distances or relative speeds in the area of the turn-around points, which might entail undesired changes in the deposition rate.

It is therefore the object of the present invention to indicate a method by means of which the blank can be produced with a predetermined, in particular axially homogeneous density and mass distribution, and to provide a simple apparatus which is suited for carrying out the method.

As for the method, this object starting from the above-mentioned method is achieved according to the invention in that the geometrical shape of the burner flame is varied by the electrical field in dependence upon the position of the deposition burner during the sequence of movement.

When looking at the surface temperature of the blank in the area of the point of impact of the burner flame during movement of the deposition burner from the one turn-around point to the other one (here designated as "sequence of movement"), one will notice that despite a constant temperature of the burner flame the surface temperature is normally not kept constant, but is locally different and, moreover, depends on the direction of movement of the deposition burner. Each position of the deposition burner during its movement towards one of the turn-around points and each position during its movement towards the other turn-around point can have assigned thereto corresponding surface temperatures which, when put together one after the other, result in a temperature profile typical of the deposition burner and the specific deposition parameters. This temperature profile depends, inter alia, on the temperature and geometry of the burner flame.

In the method according to the invention an electrical field is produced which acts on the geometrical shape of the burner flame, thereby changing the same either by changing the field strength operative in the area of the burner flame, or by measures which change the direction of the field lines in the area of the burner flame. A change in the field strength acting on the burner flame or a change in the direction of the field lines effects a change in the burner flame geometry.

This effect of the electrical field on the geometry of the burner flame is used according to the invention for modifying the above-mentioned temperature profile typical of a deposition burner by varying the geometrical shape of the burner flame during the sequence of movement of the deposition burner. For instance, local temperature peaks or valleys of a temperature profile can be compensated or avoided by decreasing or increasing the width of the burner flame by the effect of the electrical field accordingly.

The electrical field is adjusted either in dependence upon the position of the deposition burner or in dependence upon a measured variable which can be correlated with the sequence of movement of the deposition burner, e.g. the surface temperature, the volume, the mass or the diameter of the developing blank. When the electrical field is adjusted in dependence upon the position of the deposition burner, a predetermined electrical field acts on the burner flame in the case of a predetermined position of the deposition burner, so that a defined adjustment of the geometrical shape of the burner flame is made possible during the sequence of movement of the deposition burner.

This can e.g. be achieved in that the electrical field is displaced locally, e.g. following the sequence of movement of the deposition burner, and is changed thereby in time. Or also by the measure that a locally fixed and time-constant electrical field is produced whose effect, however, differs along the path of movement of the deposition burner so that the deposition burner during its sequence of movement passes through areas of different field strengths of changing directions of the field lines. In any case, the moving burner flame is subjected to a "time change in the effect of the electrical field", which is also called "field change" in the following.

With the method of the invention, the burner flame and thus the surface temperature can solely be varied by the "field change" within a wide range. A change in flow speeds or gas amounts, as suggested in the above-mentioned DE-A1 196 958, is not necessary. Thus blanks of a predetermined density and mass distribution can be produced, requiring comparatively small control and adjustment efforts.

The effect of the electrical field on the burner flame is due to the electrically charged particles in the burner flame. These may be ionized particles or electrostatically charged particles. Ionized particles are predominantly concentrated in the lower portion of the burner flame, so that the effect of the electrical field is greater than in the upper portion of the burner flame.

Instead of the deposition burner, the carrier may be reciprocated between the turn-around points in a kinematic reversal. $SiO_2$ blank means a body which, apart from dopants, entirely consists of $SiO_2$. The burners known in the production of synthetic quartz glass, in particular oxyhydrogen burners and plasma burners, are suited as deposition burners.

A "field change" has an effect on the expansion of the burner flame in the direction of the field lines. The field lines can extend in the direction of propagation of the burner flame. Preferably, however, the field lines extend within the burner flame substantially in a direction perpendicular to the direction of propagation of the burner flame, so that a "field change" has an effect on the lateral expansion of the burner flame. It is thereby possible to enlarge or narrow the burner flame in a particularly easy way. In comparison with a state without an electrical field, the maximum flame diameter can be expanded by a multiple, which depends on the optimum operative range of the burner flame without an electrical field. Distinct effects regarding mass distribution and maximum temperature are observed in the case of flame expansions starting from about 20% of the initial diameter (without electrical field). An expansion by more than five times is normally outside the optimum working range of the burner flame to such a degree that this entails losses in the deposition rate.

Preferably, the width of the burner flame is changed in dependence upon the position of the deposition burner during the sequence of movement. Width of the burner flame means here the dimension of the flame perpendicular to the main propagation direction. In principle, the width can be varied in any desired direction, preferably in the direction of the cylinder axis of the deposition surface or in a direction perpendicular thereto.

It has been found to be particularly advantageous when the width of the burner flame, when viewed in the direction of the longitudinal axis of the carrier, is changed in dependence upon the position of the deposition burner during the sequence of movement. The field lines extend here substantially in parallel with the longitudinal axis of the carrier.

Alternatively, the width of the burner flame, when viewed in a direction perpendicular to the longitudinal direction, is varied in dependence upon the position of the deposition burner during the sequence of movement. The field lines extend here substantially in a direction perpendicular to the longitudinal axis of the carrier. In the case of deposition burners which are adjacent in the direction of the cylindrical axis, this variant has the advantage that the neighboring burner flames do not affect one another to a significant degree when enlarged.

A process is preferred in which the width of the burner flame is changed by means of the electrical field in a position of the deposition burner in the area of the turn-around points. The "field change" is carried out continuously or stepwise during movement of the deposition burner towards the turn-around point, and it is again canceled upon a movement away from the turn-around point. In the area of the turn-around points, the above-mentioned typical temperature profile has maxima as a rule. These can be avoided in the method according to the invention by the measures that the burner flame is enlarged in the area of the turn-around points and the surface temperature is thus reduced. Apart from a homogenization of the surface temperature, the propagation of the burner flame has the additional effect that the $SiO_2$ particles are deposited on the blank surface such that they are spread over a wider area of said surface. The creation of density differences is thereby avoided or reduced. If essentially the temperature in the area of the turn-around points is to be controlled without the mass distribution of the $SiO_2$ particles being changed considerably, the width of the burner flame is preferably changed, when viewed in a direction perpendicular to the longitudinal axis of the carrier.

In a locally variable electrical field, these measures, which are assigned to the turn-around points of the burner movement, depend on whether the turn-around points are locally kept constant during deposition or whether they are varied over the length of the blank.

A procedure is preferred in which the $SiO_2$ particles are deposited by means of a plurality of deposition burners that, when viewed in the direction of the longitudinal axis of the carrier, are spaced apart from one another and—in a predetermined sequence of movement—are reciprocated in synchronism along the developing blank between turn-around points, with the geometrical shape of the respective burner flames being varied in synchronism by the electrical field in dependence upon the position of the deposition burner during the sequence of movement.

The deposition burners show the same sequence of movement along the blank in this instance. The path between the turn-around points of the burner movement will be designated in the following as "path of movement". The burner flames of the deposition burners are influenced and varied in synchronism by a "field change" along the "path of movement".

Each of the deposition burners can have assigned thereto a pair of electrodes for producing the electrical field in the area of the burner flame assigned to it or along the respective "path of movement". However, it is also possible to generate the "field change" by an electrical field jointly assigned to the deposition burners; in this instance, the field lines extend preferably in a direction perpendicular to the longitudinal axis of the carrier and the main propagation direction of the burner flames.

Preferred is a process in which a plurality of electrical fields assigned to the burner flames are varied in synchronism in a change cycle correlated with the sequence of movement of the deposition burners. In the simplest and therefore preferred case, a separate electrical field is assigned to each burner flame. Since the "field change" takes place synchronously, the control efforts are small. The "field change" can be carried out in steps or continuously. Independently of the synchronized "field change" in dependence upon the position of the deposition burners, the burner flame of each deposition burner can be adjusted individually by the electrical field acting thereon, so that e.g. different deposition characteristics of the deposition burners can be compensated by reason of constructional differences.

The change cycles of neighboring electrical fields are in phase in the simplest case. However, it has also been found to be of advantage when the change cycles of neighboring electrical fields are phase-shifted, preferably in phase opposition. In the case of change cycles in phase opposition, one of the deposition burners has, for instance, a comparatively small burner flame producing a high surface temperature whereas at the same time the two neighboring deposition burners have a comparatively large burner flame, thereby generating a correspondingly low surface temperature. Temperature peaks can thereby be avoided efficiently and axial density variations, in particular in the area of the turn-around points, can be minimized.

It has been found to be of advantage when the electrical field is set such that a sudden gas discharge is avoided. According to the invention the electrical field primarily influences the geometrical shape of the burner flame, but not the formation of the $SiO_2$ or dopant particles. A sudden gas discharge, e.g. in the form of an arc or glow discharge or in the form of a spark, may produce inhomogeneities and is therefore avoided, if possible.

As for the apparatus, the above-mentioned object starting from the above-mentioned apparatus is achieved according to the invention in that the electrical field, when viewed along the path of movement, is locally inhomogeneous or variable in time in dependence upon the position of the deposition burner during the sequence of movement of the deposition burner.

During the sequence of movement of the deposition burner, the apparatus according to the invention predetermines a "field change" in the sense of the above-explained method, whereby the geometry of the burner flame is influenced. This is carried out either by a time-constant electrical field which is inhomogeneous along the "path of movement" of the deposition burner, or by a time-variable electrical field which is variable during the sequence of movement in dependence upon the position of the deposition burner.

With the apparatus according to the invention, it is possible to assign a specific effect of the electrical field and thus a typical burner flame to each position of the deposition burner. A predetermined axial or radial density and mass distribution can thereby be set in a selective way in the blank.

As for the generation of the electrical field and its effect on the burner flame, reference is made to the above explanations regarding the method according to the invention. A blank with a predetermined density and mass distribution can be produced with the apparatus according to the invention, requiring relatively small control and adjustment efforts.

Preferably, the pair of electrodes is arranged laterally relative to the burner flame. The electrodes are oppositely arranged around the burner flame, so that the field lines within the burner flame extend substantially in a direction perpendicular to the propagation direction of the flame. In preferred special cases, the pair of electrodes is laterally arranged relative to the burner flame, i.e. when viewed in the direction of the longitudinal axis of the carrier or in a direction perpendicular thereto. In the first-mentioned case, the electrodes are opposite each other such that the electrical field lines extend in a direction parallel to the longitudinal axis of the carrier, resulting in a propagation of the burner flame in the direction of the longitudinal axis of the substrate due to the electrical field. In the last-mentioned case, however, the electrodes face each other such that the electrical field lines extend in a direction perpendicular to the longitudinal direction of the carrier, resulting in a propagation of the burner flame in a direction perpendicular to the longitudinal axis of the substrate due to the electrical field.

It has been found to be particularly useful when the pair of electrodes are plate electrodes which are arranged in the lower portion of the burner flame. The flat sides of the plates extend here in parallel with the main propagation direction of the burner flame. It is thus possible to produce a homogeneous electrical field over a long distance. Since ionized particles in the lower portion of the burner flame are present in higher concentrations than in the upper portion, the arrangement of the electrodes in this area of the burner flame yields a higher efficiency with respect to the "field change".

Expediently, the source of voltage and the drive device are connected to a control device by means of which the electrical field can be varied and adjusted in dependence upon the position of the deposition burner during the sequence of movement in the area of the burner flame.

The sequence of movement of the deposition burner along the surface of the developing blank is predetermined by the control device. The position of the deposition burner can therefore be determined all the time. The source of voltage is connected to the control device. Thus, a typical burner flame can be assigned by means of the control device to each position of the deposition burner by changing the electrical field. A change in the field strength or a change in the direction of the field lines has an effect on the burner flame, in particular on the geometry or temperature thereof. A predetermined axial or radial density and mass distribution within the blank can thereby be set in a selective way.

The control device correlates the adjustment of the electrical field and thus the property of the burner flame with the sequence of movement of the deposition burner. A blank of a predetermined density and mass distribution can thereby be produced, requiring comparatively small control and adjustment efforts.

In a particularly preferred development of the apparatus according to the invention, there are provided a plurality of spaced-apart deposition burners which are connected to the drive device and can be reciprocated in synchronism along the carrier in a predetermined sequence of movement between turn-around points. All of the deposition burners show the same sequence of movement along the blank. The burner flames of the deposition burners are each adjusted in dependence upon the position by the control device with the help of an electrical field acting thereon. The temperatures of all burner flames can thereby be adjusted in dependence upon the position of the respective deposition burner. An axial variation of the turn-around points is here not necessary. In comparison with the above-described prior-art apparatus, the efforts required for the instant apparatus are therefore small.

It has turned out to be of advantage when each deposition burner has assigned thereto a pair of electrodes for generating the electrical field in the area of the burner flame assigned to it. The electrical field can thereby be produced in the direct vicinity of the respective burner flame. The electrodes of the pair of electrodes are here preferably arranged at the side of the burner flame, so that the field lines intersect the respective burner flame substantially in a direction perpendicular to the direction of propagation thereof. The field lines can extend in vertical direction to, but preferably in parallel with, the longitudinal direction of the carrier, or at any desired intermediate angle.

In an alternative and equally preferred embodiment, the deposition burners are arranged in at least one row of burners extending in parallel with the longitudinal axis of the carrier, the pair of electrodes for producing the electrical field being here provided at tray both sides of and in parallel with the row of burners. One pair of electrodes is just needed for generating the electrical field for the whole row of burners. The electrodes extend preferably in parallel with the longitudinal axis of the carrier, so that the field lines of the electrical field extend in a direction perpendicular to the longitudinal axis of the carrier, and following a "field change" the dimension of the burner flame will also change in this direction.

Figure 2:
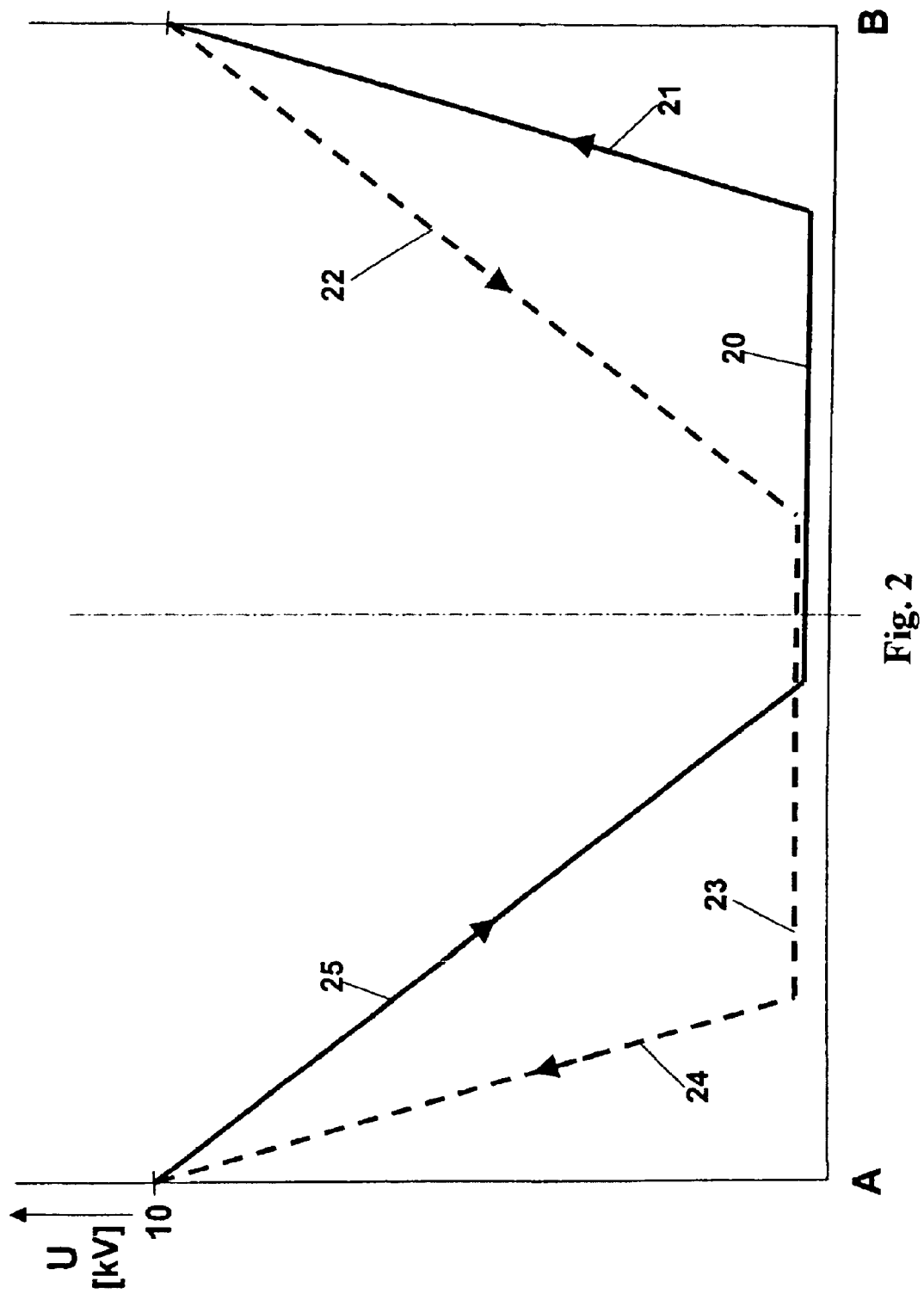
Figure 3:
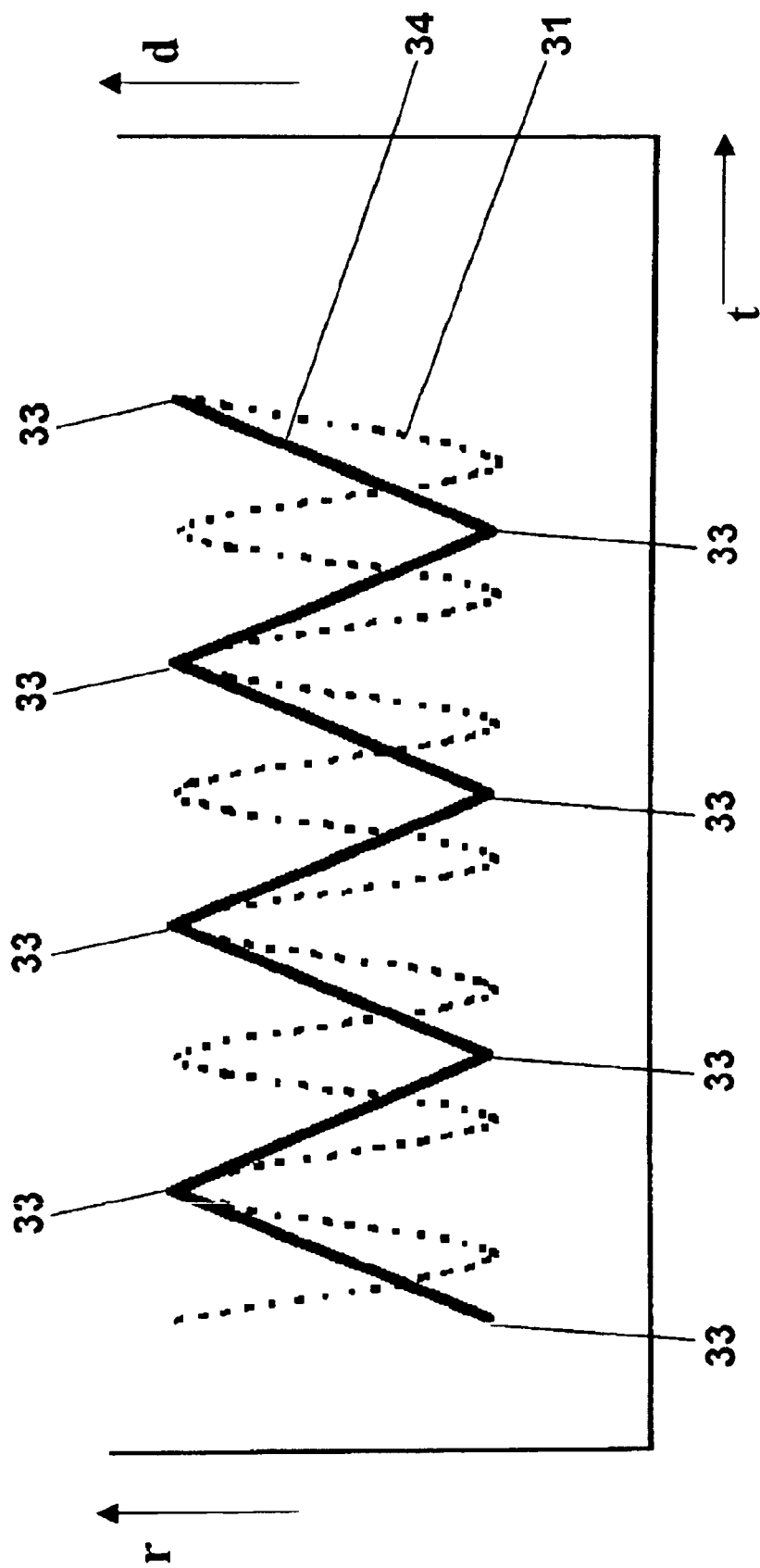

The invention shall now be explained in more detail with reference to embodiments and a drawing which is a schematic view showing in detail in FIG. 1: an embodiment of the apparatus according to the invention for performing the method according to the invention, in a side view;

FIG. 2: a diagram of the field strength curve of an electrical field in the area of a burner flame as a function of the position of a deposition burner in the area between two turn-around points A and B;

FIG. 3: a diagram of the sequence of movement (axial position) of a deposition burner and of the diameter of the burner flame as a function of time;

FIG. 4a: a diagram of the flame diameter as a function of time in a mode of operation with an opposite change phase of neighboring deposition burners; and FIG. 4b: a row of burners in a mode of operation according to FIG. 4a.

In the apparatus shown in FIG. 1, there is provided a carrier tube 1 of aluminum oxide along which a plurality of series-arranged flame hydrolysis burners 2 are arranged. The flame hydrolysis burners 2 are mounted on a common burner block 5 which can be reciprocated in parallel with the longitudinal axis 6 of the carrier tube 1 and is displaceable in a direction perpendicular thereto, as shown by the directional arrows 7 and 14. The burner block 5 is grounded. The burners 2 consist of quartz glass; their mutual distance is 15 cm.

Each of the burners 2 has assigned thereto a pair of electrodes 4 consisting of two plate electrodes 4a, 4b facing each other in pairs, each being connected to a pole of a high-voltage source 3. The plate electrodes 4a, 4b are mounted on the burner block 5 and are movable in synchronism with the burners 2. The planes of the flat sides of the plate electrodes 4a, 4b extend in a direction perpendicular to the longitudinal axis 6 of the carrier tube 1, enclosing the burner flame 8 of the respective burner 2 partly thereinbetween. An electrical field 9 which is symbolized by field lines in FIG. 1 can be produced by means of the plate electrodes 4a, 4b in the area of the burner flame 8. The field lines extend substantially in a direction perpendicular to the main propagation direction 10 of the burner flames 8 and in parallel with the longitudinal axis 6 of the carrier tube 1.

A control device 11 which is connected to the drive 16 for the burner block 5 and to the high-voltage source 3 is provided for controlling the movement of the burner block 5 and for adjusting the field strength of the electrical field 9.

$SiO_2$ particles are deposited by means of the burners 2 on the carrier tube 1 which is rotating about its longitudinal axis 6, so that the blank 13 is built up layerwise. To this end the burner block 5 is reciprocated along the longitudinal axis 6 of the carrier tube 1 between two turn-around points that are stationary relative to the longitudinal axis 6. The amplitude of the reciprocating movement is characterized by means of the directional arrow 7. It is 15 cm and thus corresponds to the axial distance between the burners 2.

The burners 2 are each fed with oxygen and hydrogen as burner gases and with gaseous $SiCl_4$ as starting material for the formation of the $SiO_2$ particles. In case of a doping operation a starting substance is additionally supplied to the burners 2 for forming the dopant, such as $GeCl_4$ for forming $GeO_2$.

The temperature of the blank surface 12 is measured continuously. To this end a thermocamera 15 is directed onto the blank surface 12 at the point of impact of the burner flame 8. The thermocamera 15 is also connected to the burner block 5 and is reciprocated therewith.

During the deposition process the distance between the burner block 5 and the blank surface 12 is kept constant by moving the burner block 5 in the direction of the directional arrow 14 accordingly.

The burner flames 8 of the deposition burners 2 are expanded and narrowed in synchronism in dependence upon the position of the burners 2 by varying the field strength of the electrical field 9 in the area of the burner flames 8 by means of the control device 11. To this end the voltage applied to the plate electrodes 4 by means of the high-voltage source 3 is changed accordingly without the occurrence of a gas discharge.

Embodiments of the method according to the invention shall now be explained with reference to FIG. 2 and the apparatus according to FIG. 1.

In the diagram of FIG. 2, the curve of the voltage "U" applied to the plate electrodes 4 is illustrated as a function of the position of a burner 2 between two turn-around points A and B. Voltage "U" is proportional to the field strength of the electrical field 9 in the area of the corresponding burner flame, the voltage producing an expansion of the burner flame.

The plotted curve is provided with directional arrows, each indicating the respective direction of the burner block movement.

The curve section which is representative of the voltage "U" while the burner block is moving towards the turn-around point B is marked by a continuous line, and the curve section during the return movement of the burner block from the turn-around point B to the turn-around point A is marked by a broken line.

Voltage "U" (and thus the electrical field strength in the area of the burner flames) is controlled on the basis of a program by means of the control device 11 in dependence upon the position of the burners 2. Starting in the center between the two turn-around points A and B (while the burner block 5 is moving towards the turn-around point B), the voltage "U" is kept at zero over a length of about 3.5 cm (curve section 20) and, from about 3 cm in front of the turn-around point B in a transitional region 21 having a length of about 3 cm, it is continuously increased up to its maximum value of 10 kV (curve section 21), the latter being reached in turn-around point B.

When the burner block 5 is moving away from the turn-around point B, the voltage "U" is continuously reduced to zero again (curve section 22), said value being reached approximately 8 cm in front of turn-around point A and kept at zero over a distance of 5 cm (curve section 23) before it is continuously increased at a distance of about 3 cm in front of the turn-around point A in a transitional region 25 of a length of about 3 cm up to its maximum value of 10 kV (curve section 24), which is reached in turn-around point A. Subsequently, the voltage is continuously reduced again to zero (curve section 25). The voltage curve shown in FIG. 2 is continuously repeated and maintained throughout the deposition process.

When voltage "U" is applied, an electrical field is produced in the area of the burner flames 8, the field strength of said field increasing when the voltage is raised. The burner flame 8 is thereby enlarged in the direction of the longitudinal axis 6 of the carrier tube 1 and the flame temperature is reduced. As a result, an overheating of blank 13 which is caused by double heating due to the reciprocating movement in the area of the turn-around points A, B is kept low, so that a substantially constant surface temperature is measured on the blank surface 12 during the deposition process.

The diagram according to FIG. 3 shows a different embodiment of an inventive variation of the burner flame 8 in dependence upon the axial position "r" of a deposition burner. The diameter "d" of the burner flame (in relative units) is plotted as a function of time "t" (in relative units). The position "r" results from the sequence of movement 31 of the deposition burner during the deposition process, the sequence being symbolized by the continuous zigzag line. It follows that the deposition burner is reciprocated between two locally fixed turn-around points 32 and 33 at a constant speed.

A sinusoidal curve 34 which is representative of the curve of the diameter "d" of the burner flame over time "t" is superposed on the sequence of movement 31. As becomes apparent, "d" has a maximum value in the area of the turn-around points 33, 34 and a minimum value in the center between the turn-around points 33, 34. The diameter of the burner flame is changed by varying the electrical field by means of the apparatus shown in FIG. 1. The burner flame is continuously expanded primarily in the direction of the field lines by intensifying the field strength of an electrical field. This results in a deformation of the burner flame towards an oval (when viewed in cross section). In this instance the length of the long main axis of the oval is regarded as the diameter of the burner flame.

The diameter of the burner flame is changed by the effect of the electrical field in dependence upon the position of the deposition burner during its sequence of movement. Local temperature peaks in the area of the turn-around points are compensated by increasing the diameter "d" of the burner flame in said area by the effect of the electrical field.

The diagram shown in FIG. 4a illustrates the change cycles of the diameter "d" of two neighboring burner flames (in relative units) of a row of burners as a function of time "t". The continuous line 41 is assigned to the change cycle of the first burner flame, and the dotted line 42 to the change cycle of the second burner flame. The time required for passing through a change cycle (maximum to maximum) is identical with the duration of a sequence of the burner movement from one turn-around point to the other one.

In the embodiment illustrated in FIG. 4a, the change cycles of the neighboring burner flames and thus of the electrical fields acting thereon accordingly are shifted in phase opposition. Therefore, the one deposition burner has a comparatively small burner flame which produces a high surface temperature, whereas the neighboring deposition burner has a comparatively broad burner flame at the same time, the broad burner flame producing a correspondingly low surface temperature.

This is illustrated by the schematic representation of the row of burners according to FIG. 4b. On account of the opposite "field change", the deposition burners 2 of the whole row of burners alternatingly show a burner flame 8 having a small diameter ($d_1$) and a large diameter ($d_2$). The "field change" takes place in synchronism for each of the two halves of the deposition burners 2.

In this mode of operation, a relatively small and thus hotter burner flame is always surrounded by two comparatively large and thus colder burner flames. Temperature peaks on the blank surface 12 can thereby be minimized.

What is claimed is:

1. A method for producing an $SiO_2$ blank, said method comprising:

forming $SiO_2$ particles in a burner flame associated with a deposition burner, said burner flame having a shape; and depositing said particles under the effect of an electrical field on a deposition surface of a carrier rotating about a longitudinal axis thereof;

said deposition burner being supported for relative longitudinal reciprocation with respect to the developing blank between turn-around points thereon; and said electrical field varying the shape of said burner flame during the reciprocation thereof dependent upon relative location of said deposition burner relative to the blank;

wherein a plurality of deposition burners are used that each have a burner flame with a shape and are spaced apart from one another longitudinally, and that are reciprocated in a predetermined sequence of movement in synchronism along the developing blank between turn-around points, the shape of the respective burner flames being changed in synchronism by said electrical field dependent upon location of said deposition burners during the sequence of movement; and wherein a plurality of electrical fields are associated with said burner flames and are varied in synchronism in a change cycle correlated with the sequence of movement of said deposition burners.

2. The method according to claim 1, wherein each burner flame has a width viewed in a direction parallel to the longitudinal axis of said carrier, said shapes of the burners being varied so that the widths of the burner flames vary dependent upon the location of said respective deposition burner during the reciprocation thereof relative to the blank.

3. The method according to claim 1, wherein each burner flame has a width viewed in a direction perpendicular to the longitudinal axis of said carrier, said shapes of the burners being varied so that the widths of the burner flames vary dependent upon the location of said respective deposition burner during the reciprocation thereof relative to the blank.

4. The method according to claim 1, wherein said electrical fields vary widths of said burner flames when the associated deposition burner is in an area of one of said turn-around points.

5. The method according to claim 1, wherein said electrical fields are adjusted so as to avoid a gas discharge.

6. A method for producing an $SiO_2$ blank, said method comprising:

forming $SiO_2$ particles in a burner flame associated with a deposition burner, said burner flame having a shape; and depositing said particles under the effect of an electrical field on a deposition surface of a carrier rotating about a longitudinal axis thereof;

said deposition burner being supported for relative longitudinal reciprocation relative with respect to the developing blank between turn-around points thereon; and said electrical field varying the shape of said burner flame during the reciprocation thereof dependent upon relative location of said deposition burner relative to the blank;

wherein a plurality of deposition burners are used that each have a burner flame with a shape and are spaced apart from one another longitudinally, and that are reciprocated in a predetermined sequence of movement in synchronism alone the developing blank between turn-around points, the shape of the respective burner flames being changed in synchronism by said electrical field dependent upon location of said deposition burners during the sequence of movement;

wherein a plurality of electrical fields are associated with said burner flames and are varied in synchronism in a change cycle correlated with the sequence of movement of said deposition burners; and wherein the change cycles of neighboring electrical fields are in phase.

7. A method for producing an $SiO_2$ blank, said method comprising:

forming $SiO_2$ particles in a burner flame associated with a deposition burner, said burner flame having a shape; and depositing said particles under the effect of an electrical field on a deposition surface of a carrier rotating about a longitudinal axis thereof;

said deposition burner being supported for relative longitudinal reciprocation relative with respect to the developing blank between turn-around points thereon; and said electrical field varying the shape of said burner flame during the reciprocation thereof dependent upon relative location of said deposition burner relative to the blank;

wherein a plurality of deposition burners are used that each have a burner flame with a shape and are spaced apart from one another longitudinally, and that are reciprocated in a predetermined sequence of movement in synchronism along the developing blank between turn-around points, the shape of the respective burner flames being changed in synchronism by said electrical field dependent upon location of said deposition burners during the sequence of movement;

wherein a plurality of electrical fields are associated with said burner flames and are varied in synchronism in a change cycle correlated with the sequence of movement of said deposition burners; and wherein the change cycles of neighboring electrical fields are phase-shifted.

8. A method for producing an $SiO_2$ blank, said method comprising:

forming $SiO_2$ particles in a burner flame associated with a deposition burner, said burner flame having a shape; and depositing said particles under the effect of an electrical field on a deposition surface of a carrier rotating about a longitudinal axis thereof;

said deposition burner being supported for relative longitudinal reciprocation relative with respect to the developing blank between turn-around points thereon; and said electrical field varying the shape of said burner flame during the reciprocation thereof dependent upon relative location of said deposition burner relative to the blank;

wherein a plurality of deposition burners are used that each have a burner flame with a shape and are spaced apart from one another longitudinally, and that are reciprocated in a predetermined sequence of movement in synchronism along the developing blank between turn-around points, the shape of the respective burner flames being changed in synchronism by said electrical field dependent upon location of said deposition burners during the sequence of movement;

wherein a plurality of electrical fields are associated with said burner flames and are varied in synchronism in a change cycle correlated with the sequence of movement of said deposition burners; and wherein the change cycles of neighboring electrical fields are in phase opposition.

9. A method for producing an $SiO_2$ blank, said method comprising:

forming $SiO_2$ particles in a plurality of burner flames each associated with a respective one of a plurality of deposition burners, said burner flames being each having a shape and being spaced apart from one another longitudinally; and depositing said particles under the effect of a plurality of electrical fields each associated with a respective burner flame on a deposition surface of a carrier rotating about a longitudinal axis thereof;

said deposition burners being reciprocated in a predetermined sequence of movement in synchronism in an axial direction relative to the developing blank between turn-around points thereon;

said plurality of electrical fields being varied in synchronism in a change cycle correlated with the sequence of movement of said deposition burners so that the shapes of the respective burner flames are changed in synchronism by said electrical fields dependent upon location of said deposition burners relative to the blank during the sequence of movement.

10. The method according to claim 9, wherein each burner flame has a width viewed in a direction parallel to the longitudinal axis of said carrier, said shapes of the burners being varied so that the widths of the burner flames vary dependent upon the location of said respective deposition burner during the reciprocation thereof relative to the blank.

11. The method according to claim 9, wherein each burner flame has a width viewed in a direction perpendicular to the longitudinal axis of said carrier, said shapes of the burners being varied so that the widths of the burner flames vary dependent upon the location of said respective deposition burner during the reciprocation thereof relative to the blank.

12. The method according to claim 9, wherein said electrical fields vary widths of said burner flames when the associated deposition burner is in an area of one of said turn-around points.

13. The method according to claim 9, wherein the change cycles of neighboring electrical fields are in phase.

14. The method according to claim 9, wherein the change cycles of neighboring electrical fields are phase-shifted.

15. The method according to claim 9, wherein the change cycles of neighboring electrical fields are in phase opposition.

16. The method according to claim 9, wherein said electrical fields are is adjusted so as to avoid a gas discharge.

* * * * *